Jan. 15, 1952  R. A. BECKWITH  2,582,220
TRANSMISSION
Filed Aug. 23, 1946  2 SHEETS—SHEET 1

INVENTOR
R. A. Beckwith
BY
Robb & Robb
ATTORNEYS

Jan. 15, 1952  R. A. BECKWITH  2,582,220
TRANSMISSION
Filed Aug. 23, 1946  2 SHEETS—SHEET 2
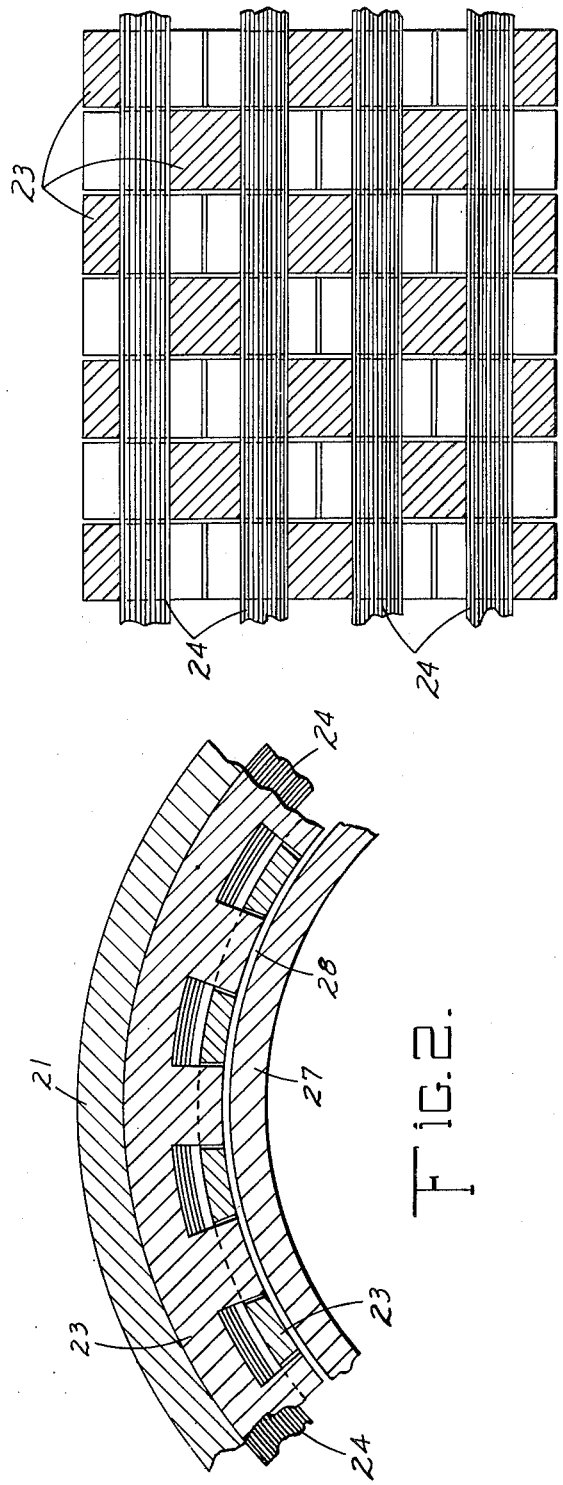
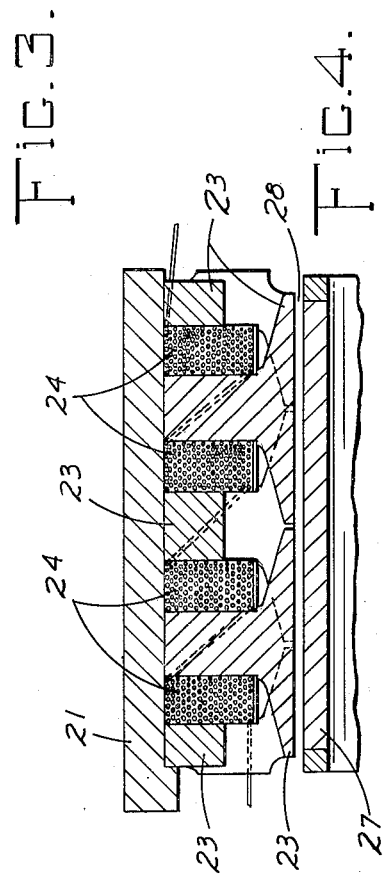
INVENTOR
R. A. Beckwith
BY
ATTORNEYS Patented Jan. 15, 1952

2,582,220

UNITED STATES PATENT OFFICE 2,582,220

TRANSMISSION

Raymond A. Beckwith, Milwaukee, Wis., assignor to Koehring Company, Milwaukee, Wis., a corporation Application August 23, 1946, Serial No. 692,473

13 Claims. (Cl. 74—330)

1

The present invention relates to power transmissions, and more especially to a novel and improved constant power flow speed change gear transmission which permits shifting of gears, or otherwise varying gear ratios, without interruption of power flow through the transmission from the driving member to the driven member.

Heretofore, in all selective ratio change speed gear transmissions, there is always an interruption of power flow through the transmission during the step or steps of shifting the gears for changing gear ratios, since the gear shifting must be performed with the input power disengaged from the transmission. A suitable clutch is therefore customarily disposed between the input power source and the transmission so as to enable the power source to be disengaged preliminary to shifting the change speed gears, and to reengage the power source after the gear shifting has been performed. When using a gasoline or diesel engine as the power source for such a transmission, the carburetor or injector throttle, as the case may be, must be changed to the position of idling adjustment as the engine is disengaged or de-clutched from the transmission. Otherwise, the engine would "race" and be subjected to undue wear and strains, as well as to other harmful effects. Thus, during gear shifting, the engine is slowed down below full operating speed, and after the gear change has been made, the clutch is reengaged and the throttle must be opened to bring the engine up to full or operating speed again.

In the case of vehicles equipped with change speed gear transmissions of the conventional type, the road speed of the vehicle is usually slower immediately after the gear shift than the road speed already acquired before performing the gear shift. This consequently creates an appreciable loss of fuel economy and operating time. In many cases, the engine cannot maintain its operating speed after the gear shift has been performed, and when this happens, especially in heavy duty equipment such as hauling equipment, the vehcile must be stopped and then restarted in low gear, followed by further progressive changes in gear ratio, with intermittent interruption of power for each change, until the highest speed that can be maintained by the engine is attained.

The present invention has for its primary object the selective attainment of speed change gear ratios without any interruption or change of the engine throttle control and its output torque, thereby allowing a proportionately large

2 constant torque to pass through the speed change gear box while such speed change is being made through the use of jaws, sliding gears, synchromeshes, or other suitable speed change mechanisms. This eliminates reduction of road speed or speed of the driven member during such gear change cycles.

A further object of the invention is to provide an auxiliary power flow through the selective speed change gear unit during the gear shifting operations, which auxiliary power flow is automatic and is synchronized with the gear shifting cycle, without any conscious effort on the part of the operator, and without any change in throttle control or loss of engine speed.

Another object of the invention is the provision of a constant power flow speed change transmission embodying a standard or other suitable selective speed change gear unit, and an electric coupling, sometimes referred to as an eddy current clutch, said speed change gear unit and electric coupling being adapted to be disposed between a driving member and a driven member and cooperating, one with the other, so that during change of gear ratios of the gear unit, the driven member is driven by the driving member through the electric coupling without change of power input or loss of speed.

A still further object of the invention is to provide a constant power flow speed change transmission embodying in combination, a selective speed change gear unit, an electric coupling or eddy current clutch, and a friction clutch interposed between the speed change gear unit and the electric coupling, said friction clutch, when engaged, normally establishing a flow of power directly to a driven member through the speed change gear unit, and when disengaged, establishing a flow of power electromagnetically through the electric coupling responsive to gear ratio changing of the speed change gear unit.

Other and further objects and advantages of the invention will be hereinafter described and the novel features thereof defined by the appended claims.

In the drawings:

Figure 2 is a fragmentary transverse sectional view taken through the eddy current clutch;

Figure 3 is a view in developed plan showing the staggered relation of the poles of the field of the eddy current clutch; and Figure 4 is a fragmentary sectional view taken through the field and the armature of the eddy current clutch, and showing the field windings which produce the eddy currents when the windings are energized.

Figure 1:
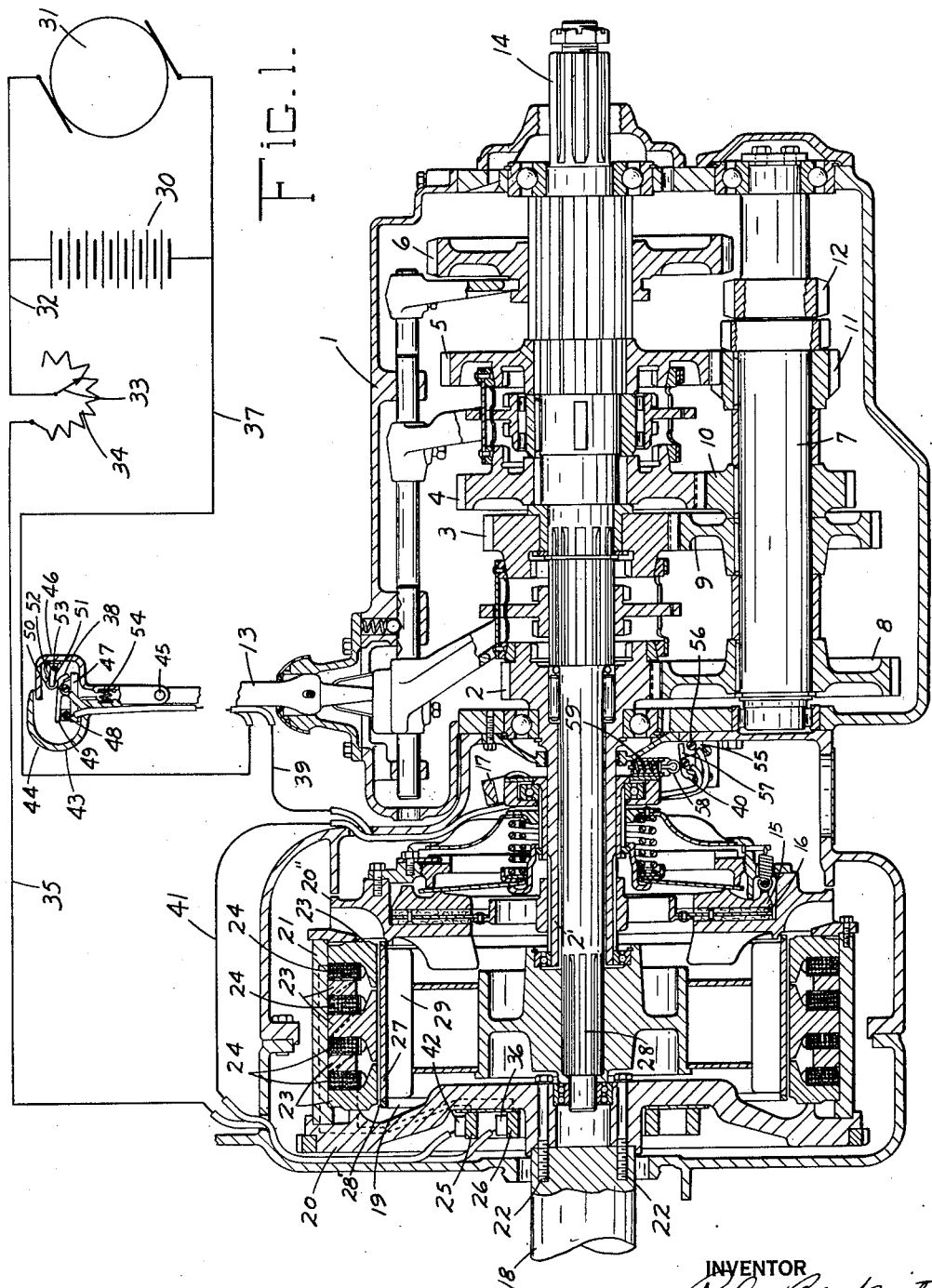
Figure 1 is a longitudinal sectional view through my new transmission, showing the relationship of the eddy current clutch, the friction clutch, and the speed change gear unit, together with the electrical circuits, shown diagrammatically, for controlling the eddy current clutch, certain of the parts being shown in elevation.

Like reference characters designate corresponding parts in the several figures of the drawings, wherein 1 generally denotes a standard speed change transmission which is of a commercially known type. As illustrated, the transmission is of the synchro-mesh change speed gear type, providing five speeds forward and one speed reverse. It is to be understood, however, that I do not wish to be limited to any particular type of change speed transmission since any other suitable type of transmission may be employed for the purposes of the present invention, whether it be of the jaw type, sliding gear type, or synchromesh type. In the form shown in the drawings, the change speed transmission includes a plurality of gears respectively designated 2, 3, 4, 5, and 6 which are change speed gears meshing with gears on a shaft designated 7 for effecting change in gear ratios. The gears on shaft 7 are respectively designated 8, 9, 10, 11, and 12, and these latter gears are suitably fixed or splined to the shaft 7. Change of gear ratio is effected by shifting certain of the gears of the group designated 2 to 6 inclusive in the conventional manner, for which purpose suitable shifting mechanism is provided, including a shifting lever designated 13.

The gears of the group designated 2 to 6 inclusive are mounted on a driven part or common shaft designated 14, one end of which, namely, the righthand end as seen in Figure 1, is adapted to be connected to a driven member, such as the propeller shaft of a vehicle. The opposite end of the shaft 14 is extended substantially beyond the speed change gear unit, and mounted on the extension of said shaft is a friction clutch generally designated 15. The friction clutch may have any suitable form, and for purposes of illustration, I have shown in the drawings a standard single-plate clutch unit which includes a disc clutch plate 16 which is splined to the hub or sleeve extension 2' of gear 2 which is freely rotatable on shaft 14, said clutch plate being axially movable on said sleeve or hub by means of the usual clutch throw-out 17.

The shaft 14 is still further extended beyond the friction clutch 15, and at its extreme end, namely, the lefthand end as seen in Figure 1, the shaft is aligned with the crank shaft 18 of a suitable source of power such as a gasoline engine or diesel engine. Disposed between the engine and the friction clutch 16 is an electric coupling known as an eddy current clutch, as indicated at 19. The eddy current clutch includes parts 20 and 20" which are arranged in axially spaced relation to each other and are interconnected by a cylindrical shell 21, together forming what may be termed as the engine flywheel. The engine flywheel is bolted or otherwise secured to the crank shaft 18 of the engine, as by means of stud bolts 22, and hence the flywheel rotates with the crank shaft at the same speed at the latter.

Carried by the flywheel and extending radially inwardly from the shell 21 thereof is a plurality of pole-pieces designated 23, said pole-pieces being arranged in circumferential rows axially spaced from each other, with the poles of each row staggered with relation to each other, as best shown in Figures 3 and 4 of the drawings. Between each row of poles there is provided a field coil, each field coil being wound peripherally and seating in the space between adjacent rows of poles, as indicated at 24. The field coil windings are preferably connected in series with each other, and the opposite ends of the field windings are suitably connected to a pair of slip-rings respectively designated 25 and 26. It will be understood from the foregoing that the poles and the field windings rotate with the flywheel and the engine crank shaft.

Also forming part of the eddy current clutch 19 is an armature 27 which is splined to the shaft 14, as indicated at 28, for rotation therewith and within the field built in the flywheel. The peripheral surface of the armature 27 is spaced slightly from the pole-pieces of the field, leaving only a small air gap 28' between the armature drum 27 and the poles 23. Within the armature drum, the armature is provided with radial fins projecting radially inwardly therefrom, as indicated at 29 for assisting in radiating heat developed in the armature, and for circulating air through the armature.

Excitation of the field of the eddy current clutch is obtained from any suitable source of electrical energy, such as the usual storage battery with which most vehicles are equipped, said storage battery being designated 30 and shown diagrammatically in Figure 1 of the drawings. The storage battery may be connected with the usual generator, as diagrammatically indicated at 31, to keep the storage battery charged. From one side of the storage battery 30, a circuit is established by a conductor 32 to the adjustable arm 33 of an adjustable rheostat 34, and from the rheostat, a circuit is established by a conductor 35 to a brush 36 having contact with one of the slip-rings, such as the slip-ring 26 which is connected to one side of the field windings. From the other side or pole of the storage battery 30, a circuit is established by a conductor 37 leading to a switch generally designated 38, carried by the gear shift lever 13, and from the switch 38 leads a conductor 39 for connecting the switch 38 in series with a second switch 40 which is actuated by the clutch throw-out 17. From the switch 40, a conductor 41 leads to a brush 42 which makes contact with the other slip-ring 25 which is connected to the opposite end of the field windings.

From the circuit diagram shown in Figure 1 of the drawings, it will be seen that the field windings of the eddy current clutch will be energized only when both of the switches 38 and 40 are closed. At all other times, that is, when either or both of these switches are open, the field windings are de-energized. Variation of excitation of the field windings can be effected by varying the adjustment of the rheostat 34.

As previously mentioned, the switch 38 is mounted on the gear shift lever 13, and is so constructed and arranged as to be actuated by gripping the knob 43 on the upper end of the gear shift lever, with which such levers are usually provided to facilitate manipulation of the same. The knob 43 includes a stationary member or part 44 which is rigid with the gear shift lever 13, and pivotally attached to the gear shift lever 13 by means of a pin 45 is a complementary pivotal member 46 which completes the form of the knob, and houses the switch 38. Attached to the rigid part 44 of the knob 43 is a stationary base plate 47, preferably of insulating material, having mounted thereon a contact member 48 at one end thereof, to which the conductor 37 is attached. Also mounted on the plate 47 and suitably insulated from the contact member 48 is a movable contact member 49 having the form of a pivotal lever to which is connected the conductor 39. Bearing upon the upper side of the movable contact member 49 is a roller 50 which is rotatably supported by a spring-pressed arm 51 against which bears a spring finger 52 attached to the inside of the movable portion 46 of the knob 43. The arm 51 is pivotally connected to the movable portion 46 of the knob, as at 53.

The movable portion 46 of the knob 43 is normally urged in a clockwise direction about the pivot pin 45, by means of an expansion spring 54, and pursuant to the expansion of the spring 54, the knob member 46, together with the roller 50 is urged to the right, as viewed in Figure 1 of the drawings, with the roller disposed at the right of the fulcrum point about which the contact arm 49 is rocked, thereby causing the contact arm 49 to move away from the stationary contact 48. Accordingly, the switch 38 is normally open and held open by the expansion spring 54. When the operator desires to shift gears or change the gear ratio, he first grasps the knob 43 and grips it, thereby moving the pivotal knob member 46 in a counterclockwise direction about the pivot pin 45, which in turn causes the roller 50 to pass over the fulcrum point of the movable contact arm 49, until the roller bears against the lefthand end of the contact arm and presses the movable contact arm against the fixed contact 48, closing the switch 38. Following closing of the switch, the gears are then shifted in the usual manner by suitable manipulation of the gear shift lever 13.

The switch 40, which is connected in series or in tandem with the switch 38, is generally similar to the switch 38, so far as its general form is concerned. In other words, the switch 40 includes a stationary base plate 55 carrying a fixed contact member 56 at one end thereof, and a movable contact having the form of a switch lever 57 which is pivoted or otherwise fulcrumed on the switch plate 55 and is insulated from the contact 56. Bearing against the upper side of the switch lever 57 is a roller 58 which is yieldingly urged against the lever by a coil spring 59, said roller and coil spring being attached to and movable with the clutch throw-out as the friction clutch 15 is manually engaged and disengaged, respectively. With the friction clutch in its normal engaged position, the roller 58 occupies a position to the left of the fulcrum point of the switch lever 57, as viewed in Figure 1, thereby rocking the switch lever in a counterclockwise direction, with its free end disengaged from the fixed contact 56. When the clutch throw-out is actuated to disengage the friction clutch, as by depressing the usual foot pedal with which such transmission systems are equipped, the roller 58 moves to the other side of the fulcrum point of the switch lever 57, thereby forcing the switch lever against the fixed contact 56, and closing the switch 40. In the circuit as shown in the drawings, the conductor 39 is connected to the fixed contact 56, and the conductor 41 is connected to the switch lever 57.

In the operation of my new transmission, power is transmitted, under normal conditions, from the engine crank shaft 18, through the friction clutch 15, which is normally engaged (that is, the friction disc 16 being normally engaged with the fly wheel assembly 20, 20″ attached to the crank shaft 18), and then through the speed change gear unit 1 which is in turn connected to a driven member (not shown), such as the propeller shaft of a vehicle. Under such conditions, the friction disc 16 of the friction clutch 15 transmits the power directly to the gear 2 of the speed change gear unit 1, said friction disc 16 being splined to the sleeve 2' which is formed integral with the gear 2. From the gear 2, the power is transmitted to the gear 8 on shaft 7, causing the shaft 7 to be driven, and from the shaft 7, the power may be transmitted to the shaft 14 at any selected gear ratio through the various gear trains composed of the gears 3—9, 4—10, 5—11, and 6—12. As previously mentioned, the gear ratios may be changed by manipulating the gear shift lever 13 in the usual manner.

Now when it is desired to shift gears, or in other words, to change gear ratios, the first operation, as customary, is to disengage the friction clutch 15, as by means of the usual foot pedal (not shown) which actuates the friction clutch throw-out 17. At the same time, or substantially simultaneously, the operator grasps the knob 43 on the gear shift lever 13, and grips the knob so as to actuate the switch 38 to its circuit closing position. If preferred, the switch 38 may be closed by gripping the knob 43 before disengaging the friction clutch 15, but irrespective of the order of actuation of the switches 38 and 40 to their closed conditions (the switch 40 being automatically closed by the action of disengaging the friction clutch 15), the field windings of the eddy current clutch will be energized as soon as both switches 38 and 40 are closed. Thus a direct current of low voltage and low amperage is impressed on the field windings of the eddy current clutch when the switches aforesaid are closed, said current passing from the storage battery through the brushes 36, 42 and their associated slip-rings 25 and 26, through the field windings. Incident to energization of the field windings, eddy currents are set up in the armature drum 27 by the lines of magnetic forces which pass from the poles 23 across air gap 28 to the armature drum 27. This establishes an electric coupling by means of which power is transmitted from the crank shaft 18 and fly wheel assembly, electromagnetically to the shaft 14 which is splined to the armature of the eddy current clutch. This electromagnetic power transmission is completely independent of the speed change operation of the transmission, allowing the operator to make any speed change he desires by suitable manipulation of the gear shift lever 13, following energization of the eddy current clutch. While the eddy current clutch is energized, the shaft 14 will receive and transmit the same torque as delivered by the engine, but not the full engine horsepower, providing the engine is running at a higher speed than the armature of the eddy current clutch, and the shaft 14. The difference between the horsepower delivered by the engine and that received and transmitted by the shaft 14, is made up through the magnetic slip between the relatively rotating parts of the eddy current clutch. This slip produces heat which is radiated by the fins 29 and dissipated by the air circulation through the eddy current clutch induced by the fan blade action of the fins.

As higher speeds or lower gear ratios are put into effect in the gear transmission, the slip of the eddy current clutch becomes less, and the horsepower delivered by the engine and the power received by the shaft 14 becomes greater, and the power loss less.

After completion of the gear shifting, or change of gear ratios, the operator reengages the friction clutch by letting up the clutch pedal, which automatically opens the switch 40 responsive to actuation of the clutch throw-out 17, at the same time, or momentarily before or after, the operator releases the knob 43 on the gear shift lever 13, thereby causing the switch 38 to open. The opening of these switches is preferably timed so as to occur simultaneously or substantially simultaneously, but as soon as either switch is opened, the field circuit of the eddy current clutch will be interrupted, and as soon as the friction clutch 15 is reengaged, the power transmission will be restored to normal, flowing from the engine crank shaft 18, through the fly wheel assembly and through the friction clutch, and then through the speed change gear unit, to the driven member connected to the latter.

At no time during the speed change is it necessary or desirable to change the setting of the engine throttle, or otherwise slow down the engine. On the contrary, the speed change occurs smoothly and naturally, without any conscious effort on the part of the operator, while the gear shifting is performed in the usual manner. In effect, there are two separate transmissions independent of each other, but operating in related cycles. First, there is the standard gear speed change transmission connected up to the engine or driving member by the friction clutch 15, and second, there is the electric coupling or eddy current clutch transmission which is also connected up to the same engine, but with no direct connecting relationship, except that they receive from and deliver power between the same points. However, the two transmissions do not both continue to deliver power through the same drive shaft at the same time, except momentarily or for a very slight instant when changing over from the normal or positive friction clutch drive to the electromagnetic drive.

In light units, such as for pleasure cars, my new transmission makes it possible to start the vehicle from a standing start without application of any friction clutch engagement until after the vehicle has started in motion. Unless a quick getaway is desired, the friction clutch need not be engaged until high speed has been acquired. In fact, the auxiliary or electromagnetic drive will handle the engine power when the vehicle has arrived at its full speed, and if no reduction ratios are necessary, the speed change gear unit need not be put into use at all.

No claim is made herein to the eddy current clutch per se, since the invention of this application resides in the combination of the eddy current clutch with the other features of the transmission system. By virtue of the combination of the eddy current clutch with the other features of the transmission system, it is possible, for the first time, so far as I am aware, to attain a constant power flow while changing speed or gear ratios, without interruption of the power. While the eddy current clutch is a comparatively recent development in the art, its principles are now well known and need not be further described herein. Suffice it to say that the torque developed by the eddy current clutch is dependent upon the percentage of full excitation that is applied to the field thereof. Hence, it is readily apparent that the torque of the eddy current clutch can be varied by changing the excitation of the field windings, such change being effected by adjustment of the rheostat 34. In the arrangement of the eddy current clutch as hereinbefore described and as shown in the drawings, the field windings of the eddy current clutch are arranged exteriorly around the armature drum.

Other changes and alterations may be made without departing from the spirit of the invention as defined in the appended claims.

I claim:

1. In a power transmission for transmitting power from a driving member to a driven member, a driving member, a driven member, a rotatable transmission shaft adapted to be connected at one end to the driven member and aligned at its opposite end with the driving member, selective change speed instrumentalities for actuating said transmission shaft, a friction clutch having a shiftable clutch disc mounted on said shaft and disposed for frictional engagement with a coacting member connected to the driving member, an electric coupling co-centered with the transmission shaft aforesaid and including means connected respectively to said transmission shaft and said driving member and disposed in coaxial spaced relation to each other for electro-magnetically transmitting power from the driving member to said transmission shaft independently of the change speed instrumentalities.

2. A transmission as defined in claim 1, wherein the electric coupling comprises an electrically energizable field and an armature.

3. A transmission as defined in claim 1, wherein the electric coupling comprises an electrically energizable field and an armature, said field being connected to and rotatable by the driving member, and said armature being connected to and rotatable with the transmission shaft.

4. A transmission as defined in claim 1, wherein the electric coupling comprises an electrically energizable field and an armature, said field having a plurality of electromagnetic poles disposed about the armature in closely spaced relation thereto.

5. A transmission as defined in claim 1, wherein the electric coupling comprises an electrically energizable field and an armature, said field having a plurality of electromagnetic poles disposed about the armature in closely spaced relation thereto, with the poles arranged in axially spaced rows.

6. A transmission as defined in claim 1, wherein the electric coupling comprises an electrically energizable field and an armature, said field having a plurality of electromagnetic poles disposed about the armature in closely spaced relation thereto, with the poles arranged in axially spaced rows and with the poles of each row staggered from the poles of the next adjacent row.

7. In a transmission as defined in claim 1, wherein the electric coupling comprises electromagnetic poles having field windings rotatably mounted and connected to the driving member, an armature mounted on the transmission shaft and rotatable therewith, and a source of electrical energy connected in circuit with the field windings for energizing the same.

8. A transmission as defined in claim 1, wherein the electric coupling comprises electro-magnetic poles having field windings rotatably mounted and connected to the driving member, an armature mounted on the transmission shaft and rotatable therewith, a source of electrical energy connected in circuit with the field windings for energizing the same, and manually operable means for opening and closing the field circuit.

9. A transmission as defined in claim 1, wherein the electric coupling comprises electro-magnetic poles having field windings rotatably mounted and connected to the driving member, an armature mounted on the transmission shaft and rotatable therewith, a source of electrical energy connected in circuit with the field windings for energizing the same, and manually operable means for opening and closing the field circuit, said last-named means including a pair of switches connected in series in said field circuit, one of said switches being operable responsive to disengaging action of the friction clutch.

10. A power transmission for transmitting power from a driving member to a driven member, comprising, in combination, a driving member, a driven member, a speed change gear mechanism including actuating means for selectively changing gear ratios, a clutch disposed between the speed change gear mechanism and the driving member including operating devices to actuate said clutch for establishing power flow from the driving member to the driven member directly through the change speed gear mechanism, and for interrupting such power flow, at will, an eddy current clutch interposed between the driven member and the driving member, and means to control energization of said eddy current clutch to transmit power from the driving member to the driven member responsive to actuation of the first mentioned clutch by the operating devices to interrupt the power flow through the change speed gear mechanism, said control means including other devices operable during actuation of the actuating means for selectively changing the gear ratios of the change speed gear mechanism.

11. A power transmission for transmitting power from a driving member to a driven member, comprising, in combination, a driving member, a driven member, a speed change gear mechanism including actuating means for selectively changing gear ratios, a clutch disposed between the speed change gear mechanism and the driving member including operating devices to actuate said clutch for establishing power flow from the driving member to the driven member directly through the change speed gear mechanism, and for interrupting such power flow, at will, an eddy current clutch interposed between the driven member and the driving member, and control means for said clutch, said eddy current clutch being energizable through said control means to transmit power from the driving member to the driven member, responsive conjointly to actuation of the first mentioned clutch by the operating devices and the actuating means for selectively changing the gear ratios of the speed change gear mechanism.

12. A power transmission for transmitting power from a driving member to a driven member, comprising in combination, a driving member, a driven member, a speed change gear mechanism including actuating means for selectively changing gear ratios, a clutch disposed between the speed change gear mechanism and the driving member including operating devices to actuate said clutch for establishing power flow from the driving member to the driven member directly through the change speed gear mechanism, and for interrupting such power flow, at will, and an electric coupling interposed between the driven member and the driving member, said electric coupling comprising an eddy current clutch and means to render said eddy current clutch inactive during transmission of power through the change speed gear mechanism, and switch means operable to energize said coupling for electrically coupling the driving member to the driven member during interruption of the power flow through the change speed gear mechanism.

13. A power transmission for transmitting power from a driving member to a driven member, comprising in combination, a driving member, a driven member, a speed change gear mechanism including actuating means for selectively changing gear ratios, a clutch disposed between the speed change gear mechanism and the driving member including operating devices to actuate said clutch for establishing power flow from the driving member to the driven member directly through the change speed gear mechanism, and for interrupting such power flow, at will, and an eddy current clutch interposed between the driven member and the driving member, and switch means operable to energize said eddy current clutch for electrically coupling the driving member to the driven member responsive to actuation of the first mentioned clutch to interrupt the power flow through the change speed gear mechanism.

RAYMOND A. BECKWITH.

REFERENCES CITED

The following references are of record in the file of this patent:

UNITED STATES PATENTS

| Number | Name | Date |
| --- | --- | --- |
| 1,601,001 | Sleeper | Sept. 28, 1926 |
| 1,665,613 | Tanner | Apr. 10, 1928 |
| 2,202,378 | Hertrich | May 28, 1940 |
| 2,260,581 | Pollard | Oct. 28, 1941 |
| 2,344,656 | Swennes | Mar. 21, 1944 |
| 2,355,709 | Dodge | Aug. 15, 1944 |